United States Patent [19] [11] Patent Number: 4,468,155
Levallois et al. [45] Date of Patent: Aug. 28, 1984

[54] METHOD AND DEVICE FOR PLACING IN A DETERMINED RELATIVE POSITION TWO ELEMENTS SUBMERGED IN A CONDUCTING LIQUID MEDIUM

[75] Inventors: Emile Levallois, Courbevoie; René Szabo, Le Pecq; Jean Clot, Saint-Orens; Daniel Esteve, Ramonville, all of France

[73] Assignee: Institut Francais du Petrole, Rueil-Malmaison, France

[21] Appl. No.: 444,297

[22] Filed: Nov. 24, 1982

[30] Foreign Application Priority Data

Nov. 24, 1981 [FR] France .................. 81 21935

[51] Int. Cl.³ .................................. F16L 1/04
[52] U.S. Cl. ........................... 405/170; 166/341;
340/852; 405/169
[58] Field of Search .................. 405/168–171,
405/158; 285/24, 27; 166/340–343; 340/852

[56] References Cited

U.S. PATENT DOCUMENTS

| 3,336,572 | 8/1967 | Paull et al. | 166/341 X |
| 3,458,853 | 7/1969 | Daniels et al. | 166/341 X |
| 3,497,869 | 2/1970 | Silverman | 340/852 |
| 4,120,095 | 10/1978 | Lebourg | 405/170 X |
| 4,140,991 | 2/1979 | Sigleton et al. | 340/852 |
| 4,148,013 | 4/1979 | Finn et al. | 340/870.38 X |
| 4,214,842 | 7/1980 | Franks | 166/341 X |
| 4,317,174 | 2/1982 | Dean | 405/195 X |

Primary Examiner—Dennis L. Taylor
Attorney, Agent, or Firm—Millen & White

[57] ABSTRACT

Method for placing two submerged elements in a relative determined position, particularly in view of their mutual connection, comprising a first step of controlling the relative displacement of said elements on the basis of the measurement of electric values so as to ensure the alignment of a central point of one end of one element with the longitudinal axis of the other and a second step of progressively bringing the two elements in contact with each other by their relative displacement controlled on the basis of the measurement of their relative distance and mutual inclination angle, by means of acoustic emitters-receivers.

21 Claims, 13 Drawing Figures

METHOD AND DEVICE FOR PLACING IN A DETERMINED RELATIVE POSITION TWO ELEMENTS SUBMERGED IN A CONDUCTING LIQUID MEDIUM

The present invention, which has been effected in co-operation with "Coflexip" and the "Laboratoire d'Automatique et d'analyse des systèmes", concerns a method and a device for placing in a determined relative position two elements submerged in a conducting liquid medium.

During operations conducted on the sea bottom, it may be desirable, for example, to place two distinct elements in a determined relative position, in order, particularly, to effect their tie-in (See French Pat. No. 2 136 291). These elements may be two pipes which have to be fastened end to end by means of a connector, or a pipe and a submerged structure such as a well or a submerged collector of the oil manifold type, etc . . . .

These operations, already difficult to conduct when effected under the direct control of divers, raise problems when using "robots" equipped with at least one television camera and lighting material. In this case, the operator, at the surface, visually controls the assembling operations and, in accordance controls the actuation of the manipulator arms of the robot.

This solution, in addition to its high cost, suffers from the disadvantages resulting from the relatively small size of the space visually controlled by the operator. As a matter of fact, the lighting provides at most for a view field of only a few meters diameter and, even frequently, not larger than two meters. Moreover, this view field is often darkened by loose sediments from the sea bottom which are stirred by the water motion resulting from the displacement of the parts to be assembled. Finally, the accuracy of the assembling is limited by the fact that, in most cases, only a two-dimensional image is available for the visual control by the operator.

In order to limit these disadvantages, locating systems have been proposed which make use of at least one acoustic emitter-receiver, rigidly secured to one of the elements to be assembled, the other element being provided with acoustic transponders (British Pat. No. 1,537,378 and No. 2,034,471). By this way it is possible to bring closer to each other the two elements to be assembled, but not to effect a sufficiently accurate positioning of these elements to obtain entirely safe mechanical connections required for certain connectors. Moreover, the particles suspended in water, e.g. resulting from the stirring of loose soils which cover the sea bottom, constitute an obstacle to the good operation of these devices since the particles may form screens on the propagation path of the acoustic waves.

It could also be considered to determine the relative position of the two elements from the measurement of the capacitance effect, but this measurement is not possible in a conducting medium and cannot be used in the considered case. An alternative embodiment of this prior technique is described in the U.S. Pat. No. 3,497,869.

The present invention makes it possible to effect the desired relative positioning of the two elements by a method and an apparatus of simple design, at relatively low cost and without the disadvantages of the prior devices.

As a general rule, the method recommended, according to the present invention, for placing two elements submerged in a conducting medium in a determined relative position, at least one these elements being provided with electrodes fed with electric current and with acoustic waves emitters-receivers, is characterized by the following steps, each of which is effected one or more times:

(a) measurement of at least one electric quantity in relation with a current passing through each of the electrodes, (b) displacement of one of the elements with respect to the other up to a position for which said electric quantity is the same for at least two electrodes, said position being substantially such as to put a central point of the external face of an element in line with the axis of the other element, (c) transmission of acoustic waves from at least two emitters-receivers placed on one of the elements and measurement of the time interval between the emission and the reception of said waves so as to determine the distance separating the two elements and their inclination with respect to each other, (d) displacement of one of the elements with respect to the other so as to minimize the distance and the inclination between the elements, thus bringing the latter sufficiently close to each other to make possible the positioning and alignment of said elements in a complementary guiding phase.

More particularly:

(a) with each of these elements is associated a series of electrodes arranged according to such a geometrical configuration as to define the location of at least a first point of the axis of the considered element, (b) with each of these elements is associated a group of acoustic members arranged according to such a geometrical configuration or pattern as to define at least a second point of the axis of the considered element, (c) the electric voltage of the electrodes of one of said assemblies is brought to a first value and the electric voltage of the electrodes of the other assembly to a second value, different from the first one, (d) the values of a parameter in relation with the electric currents passing through the electrodes of at least one of said electrode assemblies, is determined, (e) acoustic waves are propagated between the acoustic members of the two groups, (f) the values of a quantity representative of said acoustic waves propagation is determined, and (g) the relative position of the two elements is so modified that, on one hand, the values determined in step (d) be equal to predetermined values set in accordance with the geometrical configuration of the electrodes and so that, on the other hand, said quantity representative of the acoustic waves propagation reaches predetermined values set in accordance with the geometrical configurations of the acoustic member groups.

The method according to the invention provides for the assembling of the two elements by bringing them closer to each other, so that the values of said parameter and the values representing the acoustic waves propagation between the two acoustic member groups be such that both elements remain substantially in the same axial line during the step of bringing them closer to each other. The accurate positioning and alignment is achieved by complementary guiding means.

It is also possible to determine the position of an element submerged in a conducting medium by making use of a working member displaceable through said conducting medium, said working member comprising means for accurately locating its position with respect to a determined reference system by displacing said working member according to the above mentioned method to place it in contact with the submerged element and by determining therefrom the position of said submerged element in the reference system.

The device, according to the invention, for placing in a determined relative position two elements submerged in a conducting liquid medium, at least one of said elements being associated with driving means adapted to move it through the liquid, comprises:

- a first assembly of electrodes rigidly secured to a first of said elements and arranged according to a geometrical configuration whereby at least one point of the axis of said element can be defined,
- a second assembly of electrodes rigidly secured to the second element and arranged according to a geometrical configuration whereby at least one point of the axis of said element can be defined,
- a source of electric voltage having one output terminal electrically connected to the electrodes of one of the assemblies and the other terminal electrically connected to the electrodes of the other assembly,
- means for measuring values of a parameter in relation with the electric currents passing through the electrodes of one of the assemblies,
- a first group of acoustic members, rigidly secured to one of these elements, and arranged according to a geometrical configuration whereby at least one point of the axis of said element can be defined,
- a second group of acoustic members, rigidly secured to the other element, and arranged according to a geometrical configuration whereby at least one point of the axis of said element can be defined, the acoustic members of at least one of said groups being adapted to emit acoustic waves,
- means for measuring a quantity characteristic of the propagation of the acoustic waves between the acoustic members of the two groups, and
- complementary guiding means.

According to one embodiment, the means for measuring the values of said parameter in relation with the electric currents and the means for measuring the quantity characteristic of the propagation of the acoustic waves, are adapted to deliver signals representing the respective values of said parameter and of said quantity characteristic of the propagation of the acoustic waves. Moreover, the device comprises automatic control means which, upon reception of said signals, automatically actuates the driving means so as to equalize the respective values of said parameter measured for the different electrodes and to equalize the respective values of the quantity characteristic of the propagation of the acoustic waves measured at the different emitters-receivers.

The invention will be well understood and all its advantages will be made clearly apparent from the following description illustrated by the accompanying drawings wherein.

Figure 1:
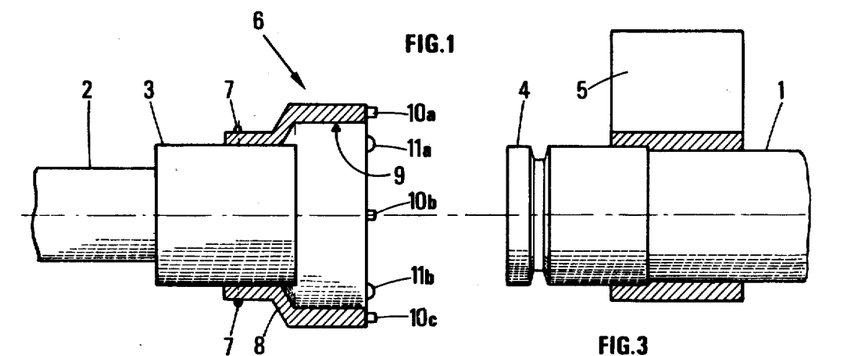
FIG. 1 diagrammatically shows the position detecting device according to the invention, used to effect the alignment of the axis of one pipe with that of an element to which the pipe must be connected.

Hereinafter, reference will be made to the non-limitative example of use of the position detection system according to the invention, for assembling, on the sea-bottom, the end of a duct or pipe 1 with an element 2 resting on the water bottom, said assembling being effected by means of a coupling or connecting element of any known type, formed of two complementary members 3 and 4, one of which is rigidly secured to element 2 and the other to the end of pipe 1.

The element 2 may be, for example, a pipe or a stationary installation on the sea bottom or resting on the water bottom, such as an oil well head, a submerged reservoir, an oil manifold, etc . . . .

The coupling will be effected either by divers, or by means of a remotely controlled robot or manipulator 5, equipped with propulsion means for displacing it through water. This manipulator may be, for example, of the type described in the French Pat. No. 79 29655 filed on Dec. 3, 1979 and entitled "Dispositif commandable à distance d'intervention sur des structures immergées, notamment de raccordement de canalisation sous-marines".

Locating means, which may be of any known type, are associated with said manipulator and permit to position pipe 1 in such a manner that the distance between members 3 and 4 of the connector be close to a predetermined value D, for example of the order of 1.5 to 2 meters, these values being however not considered as limitative, and so that the angle formed between the members 3 and 4 be at most equal to a predetermined value $\alpha_0$ which, in practice, reaches 45°.

The device according to the invention comprises a detection assembly having reference 6 in FIG. 1. This device is rigidly secured to one of the elements to be assembled. In the case of FIG. 1, the detection assembly 6 is secured onto member 3 of the connector by any known means, such, for example as by screws 7 or optionally by means making possible the recovery of said assembly after the assembling of the elements.

The body 8 of this detection device has the shape of a crown whose inner bore 9 has a diameter larger than the external diameter of the elements of the connector 3-4. The body 8 is so arranged that its axis coincides with that of the member 3 of the connector.

The body 8 is equipped with a first network comprising at least three detectors 10 preferably regularly distributed over a circumference having its center on the axis of body 8.

The body 8 carries a second network of at least three detectors 11, preferably regularly distributed over a circumference having its center on the axis of body 8.

In the case of FIG. 1, each network comprises four detectors placed at 90° from one another.

The detectors 10 of the first network consist for example of four electrodes 10a, 10b, 10c and 10d, electrically insulated from body 8.

Figure 1A:
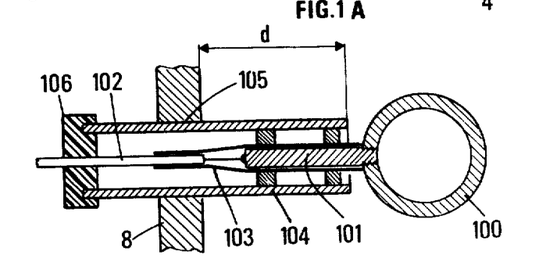
FIG. 1A illustrates an embodiment of the electrodes.

FIG. 1A shows, merely by way of example, a particular embodiment of an electrode which has proved to be entirely satisfactory.

This electrode is formed of a hollow metal sphere 100 coated with a platinum layer. This sphere is secured, for example by means of a thread, to the end of a metal rod 101, electrically connected to a conductor 102 fed with a current source, not shown. The rod 101 is electrically insulated by means of a sheath 103 and placed in an insulating tube 104 secured onto the crown 8, for example by being forced into housing 105 provided therefor. The tightness of the tube is obtained by a joint 106, for example of silastene.

These electrodes 10a to 10d are connected to one of the terminals of an alternating or direct electric voltage source 12 (FIG. 2), through a control switch 12a, the other terminal of said source being earthed. Measuring members 13a to 13d determine the value of the electric current Ia, Ib, Ic and Id, passing through the different electrodes. These measuring members 13a to 13b are adapted to deliver signals representing the values of the currents Ia to Id. These signals are transmitted to a circuit 14 which provides for the transmission of said signals in a known-per-se manner. The utility of these signals will be indicated hereinafter.

Figure 3:
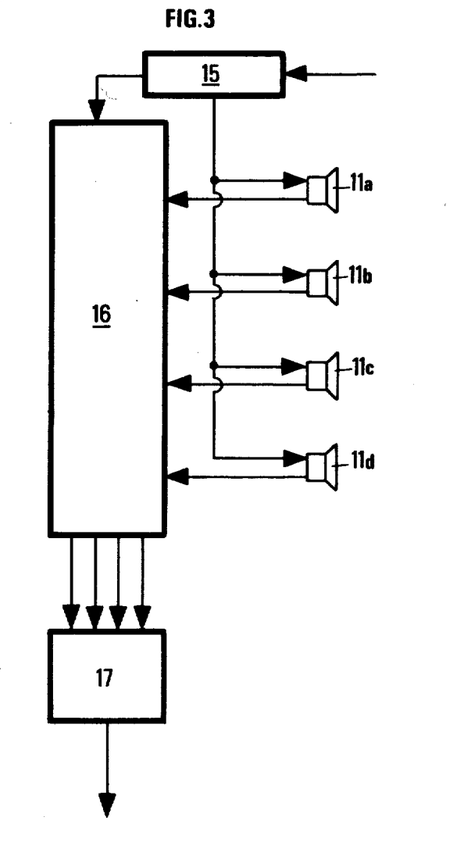
FIG. 3 shows the arrangement of an acoustic locating network used in combination with the electric locating network, FIGS. 4A to 4C diagrammatically illustrate the operation of the invention.

The detectors of the second network are for example formed of four acoustic wave emitters-receivers, 11a, 11b, 11c and 11d (FIG. 3). These emitters are for example of the piezo-electric type.

Upon reception of an electric signal generated by a control circuit 15, for example remotely controlled, each emitter-receiver emits an acoustic wave train and, upon reception of an acoustic wave, each receiver generates an electric signal transmitted to a processing circuit 16 synchronized with the control circuit 15.

This processing circuit, whose design can be effected by anyone skilled in the art (see for example IBM Technical Disclosure Bulletin Vol, 18 No. 18, January 1976), elaborates for each emitter-receiver a signal representing the time interval between the emission and the reception of the acoustic wave. A circuit 17 effects the transmission of said signal in a known-per-se manner.

Of course, the acoustic signals may be characteristic of the emitter-receiver from which they are produced, said characteristic being for example the frequency, a particular coding of the pulses forming the acoustic wave train, etc . . . .

The emission diagrams of the emitters-receivers are so selected that said emitters-receivers may operate as indicated hereinafter.

Figure 4A:
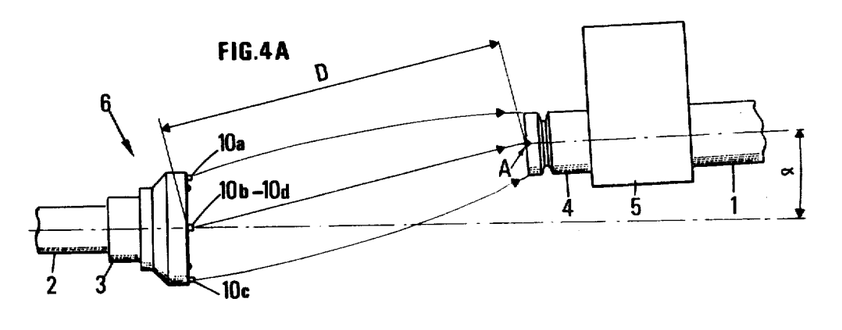
Figure 4B:
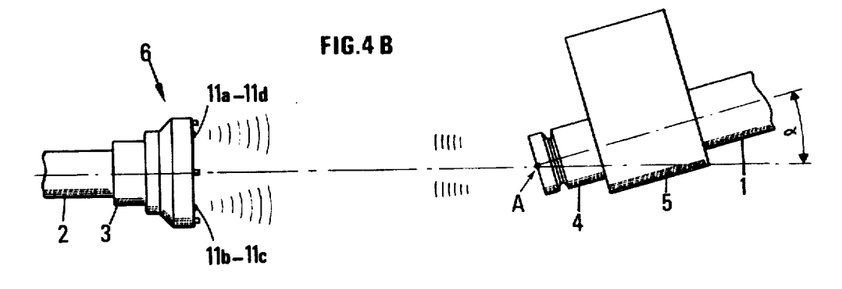
Figure 4C:
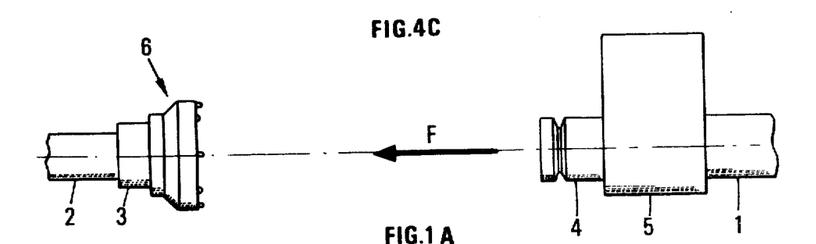

FIGS. 4A to 4C diagrammatically illustrate the carrying out of the invention.

First of all, by remote control of the manipulator 5, the end 4 of pipe 1 is brought closer to the end of member 3 (FIG. 4A), at most to a determined distance D therefrom. This distance is, for example, of about 1.5 to 2 m. The axis of pipe 1 thus forms with the axis of element 2 an angle $\alpha$ at most equal to a determined value $\alpha_0$.

The member 4 is maintained at the electric potential of the earth. The electrodes 10a to 10d are connected to the electric voltage source 12 by acting on switch 12a. An electric current then flows between each electrode 10a to 10d and the member 4. The currents Ia, Ib, Ic and Id are measured. Then the manipulator 5 is actuated so that said different electric currents become substantially equal. At this instant, the center of the end part of member 4 is substantially located on the axis of element 2 (FIG. 4B). Otherwise stated, the axes of elements 1 and 2 have an intersection point A at the end of member 4.

At said instant, the acoustic detector networks is actuated. Each emitter-receiver emits an acoustic signal which is reflected on the end face of member 4 perpendicular to the axis of said member. For each emitter-receiver, the time interval between the transmission and the reception of the acoustic wave is measured and the manipulator 5 is actuated so that these time intervals become substantially equal. When these conditions are fulfilled, the axis of element 1 substantially coincides with the axis of element 2 (FIG. 4C). It may be necessary to repeat several times at least one of the preceding operations up to the achievement of a satisfactory alignment.

The manipulator is actuated for displacing the pipe 1 in the direction of the arrow F so that, at each instant, the above-mentioned conditions be fulfilled, i.e. that, simultaneously, the electric currents emitted respectively by electrodes 10a to 10d remain substantially equal and the travel times of the acoustic waves between the respective emitters and the end of member 4 remain substantially identical to each other.

As it is apparent from the above-description, the emission diagram of the acoustic emitters-receivers along a direction substantially parallel to the axis of the connector member 3, must permit the reflection of the acoustic waves until the end part of member 4 be substantially in the plane containing the emitters.

The final fitting of members 3 and 4 of the connector will be made more easy by designing the latter with complementary shapes comprising at least one surface of revolution, for example a conical surface.

The positioning of member 4 may be better controlled by making use of a plane plate 18 for reflecting the acoustic waves, secured for example to the manipulator 5, perpendicularly to the axis of element 2 (FIG. 5) in association with emitters-receivers having directional emission diagrams.

Figure 2:
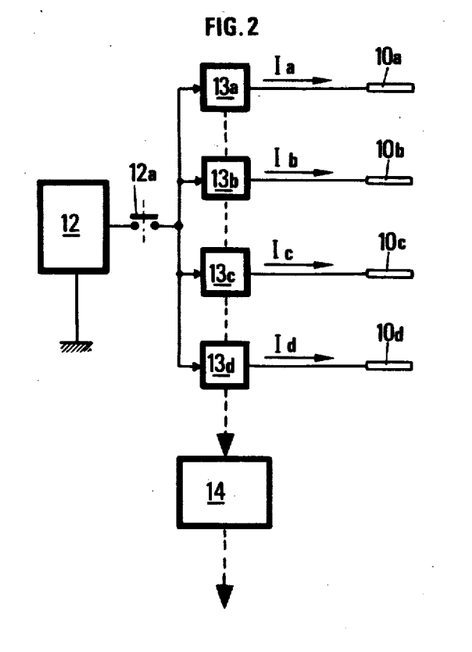
FIG. 2 illustrates the arrangement of an electrical locating network.

The transmission of the signals from the transmission devices 14 and 17, may be effected by cable or advantageously in the form of coded acoustic wave trains, thus avoiding any material connection.

This transmission may be effected towards the surface where the value of the signals may be displayed and can be used as information by the operator which remotely controls the manipulator 5.

However, according to a particular embodiment, the transmission means 14 and 17 provide for an acoustic transmission of the informations towards a receiver carried by the manipulator 5.

Control circuits, connected to the receiver and which can be designed by those skilled in the art, automatically actuate the driving means for moving the manipulator 5 so as to maintain the axes of elements 1 and 2 in alignment during the phase of bringing these elements closer to each other.

Of course, the device 6 may also be rigidly secured to the member 4 or to the manipulator 5.

In the tests the alignment of the axes were maintained within the following limits:
  angle formed between the axes of elements 1 and 2 lower than 3°, distance between the axes lower than 1 cm.

Figures 5, 6:
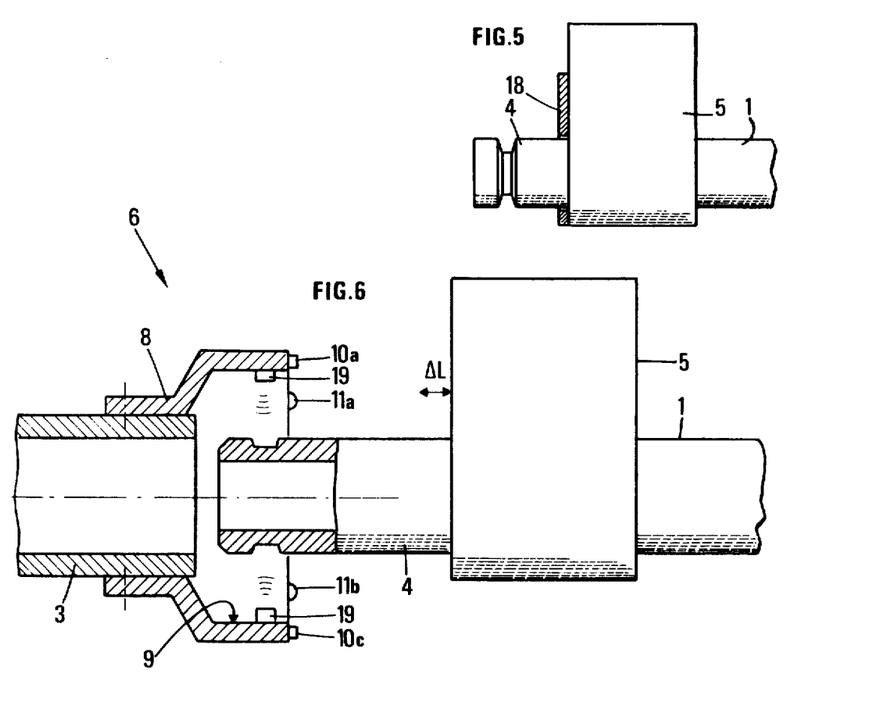
FIG. 5 shows an alternative embodiment of a manipulator according to the invention.
FIG. 6 shows a complementary device for positioning the pipe.

The accurate alignment of the axes of elements 1 and 2 at the moment of their connection is obtained by the use of complementary guiding means, for example by making use, in combination with the above-described detection networks, of a complementary centering network diagrammatically illustrated in FIG. 6. This network comprises at least three acoustic emitters-receivers arranged in the bore 9 of body 8 and in a plane substantially perpendicular to the axis of member 3 of the connector. These emitters-receivers emit radially.

For a given position of member 4, the time interval between the emission of the acoustic waves of the reception of the reflected acoustic wave is measured for each emitter-receiver and then, after an axial displacement $\Delta L$ of member 4, the measurements are repeated and the position of the manipulator 5 is modified so that the measured travel times be identical for all the emitters-receivers, i.e. so as to place in coincidence the axes of members 3 and 4.

Figure 7:
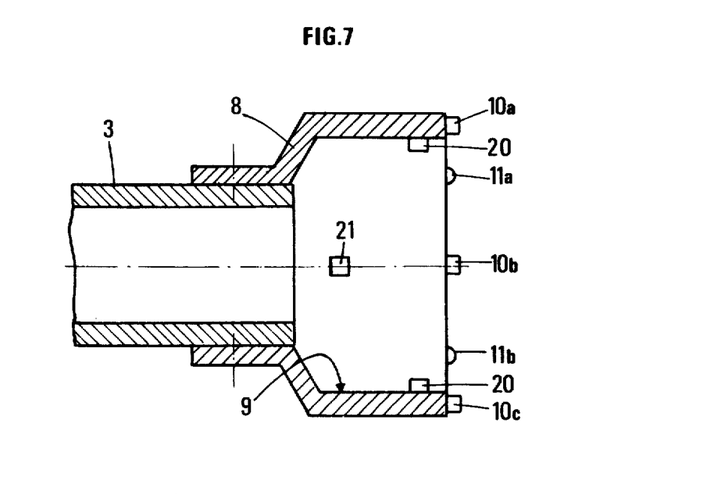
FIG. 7 shows an alternative embodiment of the positioning complementary device.

According to another embodiment shown in FIG. 7, the complementary centering network comprises at least two pairs of emitters-receivers 20 and 21, placed in the bore 9 of body 8 and emitting radially. One of said pairs is placed in a first plane perpendicular to the axis of member 3 and the second pair is placed in a second plane perpendicular to the same axis. The two pairs are located in different radial planes. Under these conditions, alignment of the axes of members 3 and 4 may be effected by measuring, for each emitter-receiver, the time interval between the emission of the acoustic wave and the reception of the reflected acoustic waves and by modifying the position of member 3 so that these time intervals become equal. By this way, a distance between the axes of less than one tenth of millimeter and an angle between the axes of the elements lower than 0°15, can be obtained.

Modifications may be brought without necessarily departing from the scope of the present invention. As a matter of fact, in the preceding description, the assembling of members 3 and 4, having the shape of surfaces of revolutions centered on the axes which must be aligned, have been considered.

When this is not the case, it would be easy to associate with member 4 electrodes judiciously distributed about the axis of said member, these electrodes being maintained at the same electric potential different from that applied to electrodes 10a to 10d.

It would also be possible to associate acoustic receivers with member 4 and to measure the travel time of the acoustic waves between the emitters carried by member 3 and the receivers rigidly secured to member 4.

As a general rule, the electrodes and the acoustic members associated with one of the elements are arranged according to a geometrical configuration determining at least one point of the axis of said element, the measured quantities relating to the electric currents and to the propagation of the acoustic waves taking predetermined values in relation with the geometrical configurations, when the axes of the two elements are in alignement.

Moreover, the distribution of the electrodes or the acoustic members about the axes of the element with which they are associated, may be judiciously selected, not only to provide for the alignment of the axes of the two elements, but also to provide for a determined relative positioning of said elements about the alignment axis.

In the above description, it has been stated that the electric current emitted by the electrodes 10a . . . is measured. As a general rule, there is measured a quantity relating to the electric current, such, for example, as the voltage of the electrodes, the electric resistance between the electrodes 10a . . . and the member 4 etc. . . .

Figure 8:
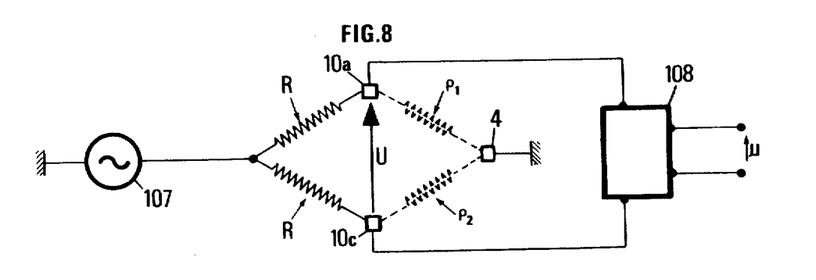
FIG. 8 shows an example of embodiment.

By way of example, a device according to the invention has been designed with four electrodes 10a, 10b, 10c, 10d arranged on the crown 8 and diametrally opposite by pairs.

The detection was effected by associating the electrodes by pairs as shown in FIG. 8. The two electrodes 10a and 10c were fed parallelly from an alternating current source 107 through two resistors of equal resistance R. The currents emitted by the electrodes 10a and 10b, circulated back to member 4. The resistances $\rho_1$ and $\rho_2$ between the member 4 and the electrodes 10a and 10c formed with the resistors R a Wheatstone bridge.

The interelectrode voltage U thus represented the position of the member 4 with respect to the electrodes and was nullified when the center of member 4 was placed on the mediatrix of the segment delimited by the two electrodes. This voltage, processed in an alternating/direct current converter 108 which delivered a voltage u, made it possible to visualize the position of member 4 on a cathodic screen.

In the examples illustrated in the preceding figures, the detection assembly 6 is carried by that one of the members to be assembled which is stationary. Of course, it would not be outside the scope of the invention, to fasten the device 6 onto the movable member 4.

Figure 9:
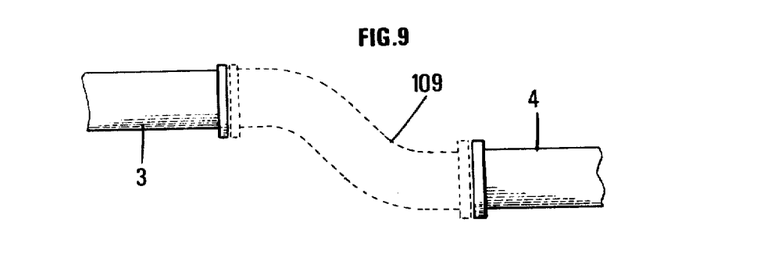
FIGS. 9 and 10 show another utilization of the device according to the invention.

In the above description it has been admitted that the end of one of the elements to be assembled was movable so as to effect the connection of the two elements. In practice, this is not always possible as a consequence of the weight and the size of these elements. For example, after immersion on the sea bottom, it is difficult to displace, with respect to each other, the two ends of two pipe sections of very great length. Often, after immersion, the ends of two sections 3 and 4 (FIG. 9), are close to each other, but cannot be directly connected. There is then used an intermediary connector 109, shown in dashed line on FIG. 9. This connector is often called "sleeve connector" and is specially designed at the proper size after a diver has identified the relative position of the ends of the elements 3 and 4 with the aid of a gauge.

By the present invention, the intervention of the diver can be avoided and accordingly, this connecting method can be used even at great depth, where the intervention of divers is not possible.

For this purpose the device 6 according to the invention is associated with a moving member 110 of any known type and whose position may be determined at every instant with accuracy with respect to a reference system.

Figure 10:
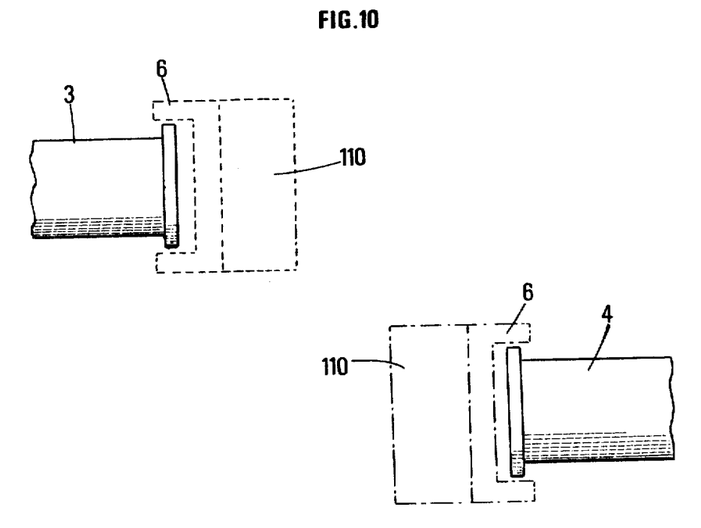

Thus, as shown in FIG. 10, member 110 is moved, as previously indicated, so that the device 6 according to the invention be positioned at the end of element 3 as shown in mixed line in FIG. 10. The position of member 110 is then located with respect to the reference system, said position being representative of the end of member 3 in the reference system.

Then the member 110 is moved so that the device 6 be placed at the end of member 4 (position diagrammatically shown in dashed line in FIG. 10). The new position of member 110 is then located in the reference system, said new position being representative of the end of element 4 in said reference system.

It is then easy to manufacture a new sleeve connector 109 adapted to connect the two elements 3 and 4. This sleeve connector may also be positioned for example by a manipulator robot, not shown.

What is claimed is:

1. A method for placing two elements submerged in a liquid medium in a determined relative position, one of said elements being provided with several electrodes fed with electric current and with acoustic waves emitters-receivers, characterized by the following steps, each of which is effected one or more times:
   (a) at least one electric quantity in relation with the current passing through each of the electrodes is measured,
   (b) one of the elements is moved with respect to the other up to a position at which said quantity is the same for at least two electrodes, said position substantially corresponding to the putting in line of a central point of the external face of one element with the axis of the other element,
   (c) an acoustic wave is emitted from at least two emitters-receivers placed on one of the elements and the time interval separating the emission from the reception of said waves is measured so as to determine the distance separating the two elements and the inclination of one element with respect to the other,
   (d) one of the elements is moved with respect to the other, so as to minimize the values of distance and inclination between the elements, thus bringing the latter sufficiently close to each other to make possible the positioning and the alignment of said elements in a complementary guiding phase.

2. A method according to claim 1, characterized in that:
   (a) with each of said elements is associated an assembly of electrodes arranged according to a geometrical configuration which makes possible to define at least a first point of the axis of the considered element,
   (b) with each of said elements is associated a group of acoustic members, arranged according to such a geometrical configuration that at least a second point of the considered element can be defined,
   (c) the electric voltage of the electrodes of one of said assemblies is brought to a first value and the electric voltage of the electrodes of the other assembly to a second value different from the first one,
   (d) the values of a parameter, in relation with the electric currents passing through the electrodes of at least one of said electrode assemblies, are determined,
   (e) acoustic waves are propagated between the acoustic members of the two groups,
   (f) quantities representative of the propagation of said acoustic waves are determines, and
   (g) the relative position of the two elements is so modified that, on the one hand, the values determined in step (d) be equal to values predetermined in relation with the geometrical configurations of the electrodes and so that, on the other hand, said quantity representative of the acoustic wave propagation reaches values predetermined in relation with the geometrical configurations of the acoustic member groups.

3. A method according to claim 2 for assembling two elements, characterized in that said elements are brought close to each other, so that the values of said parameter and the values of the quantity representating the propagation of the acoustic waves between the two acoustic member groups be such that the two elements remain in alignment on the same axis when they are brought closer to each other.

4. A method for the alignment of the axes of two elements submerged in a conducting liquid medium, a first of said elements being electrically conducting and having at its end, the shape of a surface of revolution centered on the axis of the element, characterized in that:
   (a) at least three electrodes are associated with a second element, these electrodes being distributed about the axis of said second element in a plane substantially perpendicular to said axis,
   (b) an acoustically reflecting surface, associated with one of the elements, is placed substantially perpendicularly to the axis of said element and at least three acoustic wave emitters-receivers are associated with the other element and are placed about the axis of said element in a plane substantially perpendicular to said axis these emitters-receivers being adapted to directly emit acoustic waves in a direction substantially parallel to the axis of said element,
   (c) the electric voltage of the three electrodes is brought to a first value and the electric voltage of the end of the first element to a second value different from the first one,
   (d) the values of a quantity related to the electric currents passing through the through the three electrodes is measured,
   (e) the three acoustic wave emitters-receivers are actuated and
   (f) the relative position of the two elements is so modified that the measured values of said parameter become substantially equal,
   (g) for each emitter-receiver, the time interval between the emission of the acoustic wave and the reception of the acoustic wave reflected on the reflecting surface is measured,
   (h) the relative position of the two elements is so modified that the time intervals measured for the different emitters-receivers become substantially identical to one another while substantially maintaining equal the values of the electric currents, and
   (i) a complementary guiding phase is effected.

5. A method according to one of the preceding claims, characterized in that the complementary guiding phase is effected by means of acoustic waves.

6. A method for assembling two elements by bringing them closer to each other after having preliminarily aligned them according to the method of claim 5, characterized in that the complementary guiding phase provides for a more accurate alignment of the axes of the elements at the moment of their assembling, by means of at least three acoustic emitters-receivers arranged in a plane perpendicular to the axis of one element and emitting radially with respect to said axis, by measuring for at least two successive positions of the other element and for each emitter-receiver, the time interval between the emission instant and the reception instant of the acoustic wave reflected on the other element, and by modifying the relative position of the two elements in dependence with the measured values of said time intervals so as to place the axes of the two elements in accurate coincidence.

7. A method for assembling two elements by bringing them closer to each other after their preliminarily alignment, in conformity with claim 5, characterized in that the complementary guiding phase provides for a more accurate alignment of the axes of the elements at the moment of their assembling, by means of at least two pairs of acoustic emitters-receivers, arranged in two separate planes perpendicular to the axis of one of the elements, the two pairs of emitters-receivers emitting radially with respect to said axis and being not located in a same plane containing the axis of said element, in that, for each emitter-receiver, the time interval between the emission instant and the reception instant of the acoustic wave reflected on the other element is measured and in that the relative position of the two elements is modified in accordance with said measured time intervals, so as to provide for the accurate coincidence of the axes of the two elements.

8. A method for determining the position of an element submerged in a conducting medium, making use of a member movable in said conducting medium, said member comprising means for accurately locating its position with respect to a determined reference system, characterized in that said member is displaced according to the method of claim 1 so as to place it in contact with the submerged element and in that the position of the submerged element in the reference system is derived therefrom.

9. A method for effecting the connection of two elements stationary with respect to each other, comprising locating, according to the method of claim 8, the position of each of the elements with respect to a same reference system and determining from the so-located two positions, the configuration of a member adapted to provide for the connection of the two elements.

10. A device for placing in a determined relative position, two elements submerged in a conducting liquid medium, at least one of said elements being associated with means adapted to move it through the liquid, characterized in that it comprises:
- a first assembly of electrodes rigidly secured to a first elements and arranged according to a geometrical configuration whereby at least one point of the axis of said element can be defined,
- a second assembly of electrodes, rigidly secured to the second element and arranged according to a geometrical configuration whereby at least one point of the axis of said element can be defined,
- a source of electric voltage having one output terminal electrically connected to the electrodes of one of the assemblies and the other output terminal electrically connected to the electrode of the other assembly,
- means for measuring the values of a parameter in relation with the electric currents passing through the electrodes of one of the assemblies,
- a first group of acoustic members rigidly secured to one of the elements, arranged according to a geometrical configuration whereby at least one point of the axis of said element can be defined,
- a second group of acoustic members rigidly secured to the other element, arranged according to a geometrical configuration whereby at least one point of said element can be defined, the acoustic members of at least one of said groups being adapted to emit acoustic waves,
- means for measuring a quantity characteristic of the propagation of the acoustic waves between the acoustic members of the two groups, and
- complementary guiding means.

11. A device according to claim 10, characterized in that the means for measuring the values of said parameter in relation with the electric currents and the means for measuring the quantity characteristic of the propagation of the acoustic waves are adapted to deliver signals representative of the respective values of said parameter and of said quantity characteristic of the propagation of the acoustic waves, and in that it comprises automatic control means which, upon reception of said signals, automatically actuate moving means for equalizing the respective values of said parameter measured for the different electrodes and for equalizing the respective values of the quantity characteristic of the propagation of the acoustic waves measured at the different emitters-receivers.

12. A device according to claim 10, characterized in that each electrode assembly comprises at least three electrodes regularly distributed over a circumference centered on the axis of the element to which said electrode are rigidly secured and perpendicular thereto.

13. A device according to claim 10, wherein one of the ends of the second element has a shape of a surface of revolution about its axis and is electrically conducting, characterized in that said first end replaces said second electrode assembly and in that the first electrodes assembly comprises at least three electrodes regularly distributed over a circumference perpendicular to the axis of the first element and centered on said axis.

14. A device according to claim 10, characterized in that the acoustic members of one of the groups are constituted by at least three acoustic wave emitters-receivers, regularly distributed over a circumference centered on the axis of the element to which are rigidly secured said acoustic members and perpendicular to said axis, and in that said emitters-receivers emit acoustic waves in a direction substantially parallel to the axis of said element.

15. A device according to claim 14, characterized in that the group of acoustic members of the other element is constituted by an acoustically reflecting surface, placed perpendicularly to the axis of the element to which it is secured and in that the quantity characteristic of the propagation of the acoustic waves is the time interval separating the emission of the acoustic waves from their reception by said emitters-receivers after reflection on said reflecting surface.

16. A device according to claim 14, characterized in that said reflecting surface is the front face of the corresponding element.

17. A device according to claims 13 and 15, characterized in that it comprises a body of annular shape, rigidly secured to the first element, and in that said electrodes and said emitters-receivers are carried by said body and distributed over a same circumference.

18. A device according to claim 17, characterized in that it comprises in the bore of said body a plurality of acoustic emitters-receivers, placed in at least one plane perpendicular to the axis of said body and emitting radially and means associated with each emitter-receiver for determining the time interval between the instant of emission and the instant of reception of the reflected acoustic wave.

19. A device according to one of claims 10 to 18, characterized in that the complementary guiding means comprises acoustic members.

20. A device according to claim 19, characterized in that the acoustic members of the complementary guiding means comprises at least three acoustic emitters-receivers arranged in a plane substantially perpendicular to the axis of one of the elements and radially emitting with respect to said axis.

21. A device according to claim 19, characterized in that the acoustic members of the complementary guiding means comprise at least two pairs of acoustic emitters-receivers arranged in two separate planes substantially perpendicular to the axis of one of the elements, the two pairs of emitters-receivers emitting radially with respect said axis and being not located in the same plane containing the axis of the element.

* * * * *